Sept. 30, 1941. L. E. WELLS 2,257,489
STORAGE BATTERY
Filed Nov. 18, 1939
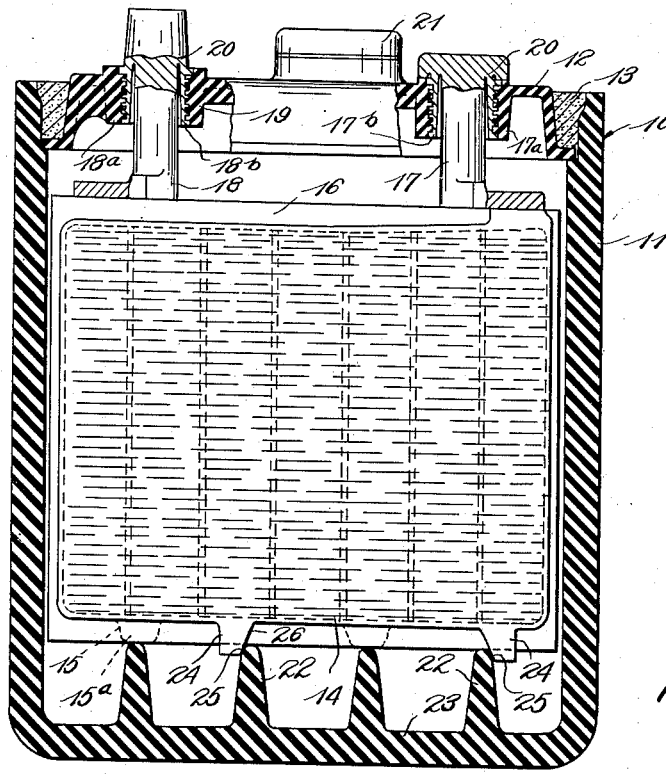
Fig.1
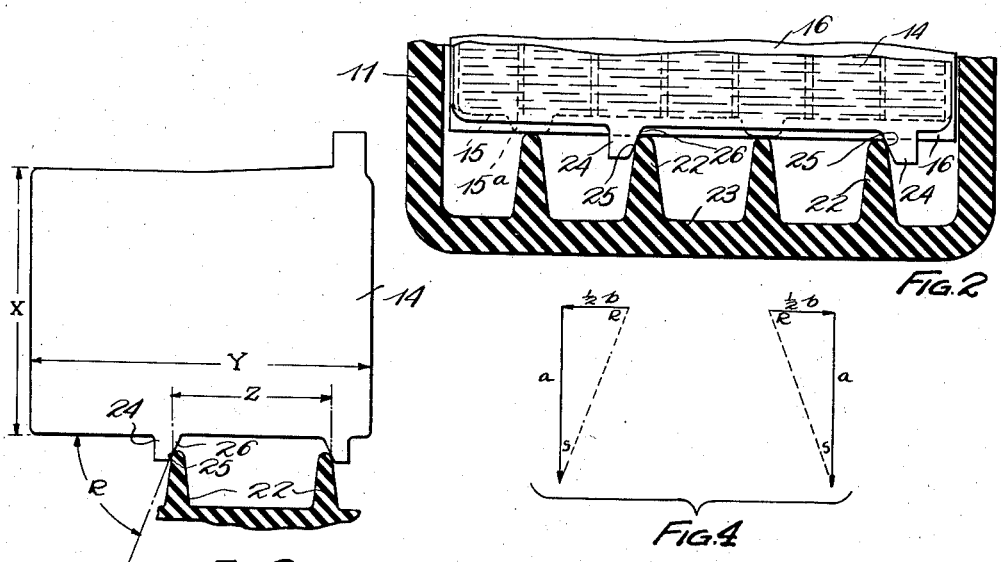
Fig.2
Fig.3
Fig.4
INVENTOR.
LELAND E. WELLS
BY
Kwis Hudson & Kent
ATTORNEYS Patented Sept. 30, 1941

2,257,489

UNITED STATES PATENT OFFICE 2,257,489

STORAGE BATTERY

Leland E. Wells, Cleveland Heights, Ohio, assignor to Willard Storage Battery Company, Cleveland, Ohio, a corporation of West Virginia Application November 18, 1939, Serial No. 305,121

5 Claims. (Cl. 136—79)

This invention relates to storage batteries, and more particularly, to an improvement therein for compensating for the undesirable effects heretofore resulting from plate "growth" or expansion.

Those skilled in the battery art are aware that there occurs, during the life of a storage battery, a growth or expansion of the plates, particularly of the positive plates, and that such growth or expansion usually has injurious effects on the battery which may materially shorten the life thereof. Such injurious effects may include a pushing upward by the plates against the cover resulting in the breaking of the seal around the cover and a loss or seepage or electrolyte. Growth of the plates may also result in their becoming buckled or bent to an extent sufficient to permit the dropping out of active material, or may result in a tearing or shifting of the separators and possibly also in a short-circuiting of the plates.

To overcome these difficulties, I have devised means for compensating for plate growth so that even though growth occurs during the use of the battery it will not damage the battery or shorten the useful life thereof. It may, therefore, be said that the principal object of this invention is to provide novel means for compensating for plate growth in a storage battery.

Another object of my invention is to provide an improved storage battery having means therein for compensating for plate growth by controlling the direction of plate movement resulting from such growth whereby the tendency to cause loosening of the cover, buckling of the plates or other injurious effects is avoided.

Still another object of my invention is to provide an improved storage battery having plate rests and in which the cooperating portions of the plates and rests are formed so that the plates will always be located or centered in the battery container and such that the vertical component of the plate movement resulting from the growth thereof will be downward or in a direction away from the cover.

A further object of my invention is to provide an improved storage battery of the type having plate rests therein and posts extending through the cover with sealing portions or bushings embedded therein, and wherein the engagement between the plates and the rests is a sloping engagement which is maintained during the plate growth and acts to control the direction and extent of the movement resulting from such growth.

Other objects and advantages of my invention will be apparent from the following description when taken in conjunction with the accompanying sheet of drawings in which, Fig. 1 is a vertical sectional view taken through a storage battery embodying my invention;

Fig. 2 is a partial sectional view taken through the battery of Fig. 1, but showing the position of the plates therein after plate growth has taken place;

Fig. 3 is a diagram to which reference will be made in explaining the use of my formula for determining the angle of the sloping engagement between the plates and the plate supports; and Fig. 4 is a diagram to which reference will be made in explaining the derivation of the formula.

My growth compensating means will be presently described more in detail and in so doing, reference will be made to the particular storage battery and compensating means illustrated in the accompanying drawing, but it should be understood that the invention is not necessarily so limited but may be applied to various forms of storage batteries and may be embodied in various other specific compensating arrangements.

Before proceeding with the detailed description of my growth compensating means, it might be well to explain briefly that by plate "growth" I mean the tendency or characteristic of storage battery plates to expand or enlarge during the life of the battery. Such growth may be due to sulphation of the active material and electrolysis of the lead in the grid, and possibly, to various other causes or factors. One explanation of this growth is that when the battery is used or permitted to stand for a period of time, the active material changes to lead sulphate and since the density of the sulphate is less than that of the active material, the sulphating causes the plate to expand or grow. Although recharging the battery changes the sulphate back to active material, it frequently happens that all of the sulphate is not so changed and a hard lead sulphate gradually forms and then, upon further change, the active material expands against this hard compound, as well as against the lead grid, causing further growth or expansion. Plate growth may also be accounted for in part by the electrolysis of the grid during which the lead changes over to active material and because the density of the lead oxide thus formed is less than that for metallic lead, the newly formed active material will require more room and thus cause the plate to grow. The latter type or portion of the plate growth is acquired particularly through overcharging of the battery. Another cause of plate growth or expansion is the generation of heat in the battery during charging or discharging thereof.

Regardless of the exact cause or causes of plate growth in a storage battery, it is recognized by those skilled in the art that plate growth does occur and I have determined by observation and experiment that in a plate of a given size the rate or per cent of growth, which is hereinafter designated K, is substantially the same for all directions. Although plate growth takes place in all directions, the growth in the vertical dimension of the positive plates is particularly troublesome because it causes the cover to be pushed upwardly thereby breaking the sealing compound around the cover and giving rise to leakage or seepage of electrolyte. Growth in the lateral direction may cause the edges of the plates to engage the side walls of the container and produce buckling or bending of the plates, which then permits the active material to loosen and drop out. Plate growth may also result in tearing or shifting of the separators or in the edges of the plates being extended too far beyond the edges of the separators. These harmful effects may, in turn, result in more extensive damage and a short-circuiting of the plates.

My invention overcomes these disadvantages by providing compensating means which causes the plates to grow or expand downwardly instead of upwardly and which also serves as a means for holding the plates against lateral shifting or centering the same with respect to the side walls of the container.

In Fig. 1 I show a storage battery 10 having my growth compensating means embodied therein. This storage battery may comprise a container 11 having a cover 12 adjacent the top thereof which is sealed around its outer edge by sealing compound 13. This battery may also include the usual groups of positive and negative plates 14 and 15 with separators 16 disposed between adjacent plates. These groups of plates are provided, respectively, with terminals or posts 17 and 18 which project upward through sleeves 17a and 18a provided on the cover 12. Lead bushings 17b and 18b may be mounted in the sleeves of the cover and may have ribs 19 on the outside thereof which are embedded in the material of the cover to form a fluid-tight seal. It is frequently the practice in building batteries of this type to connect the upper ends of the posts 17 and 18 with the bushings 17b and 18b by lead burning, as indicated at 20, and this results in a more or less rigid connection or interlock between the plate groups and the cover and renders more necessary or desirable a growth compensating means which will prevent lifting of the cover and breaking of the seal formed by the compound 13.

As is usual in batteries of this type, the container 11 may be partially filled with a suitable electrolyte. The cover 12 may also have a vent and filling opening therein in which the usual closure plug 21 is removably mounted.

For supporting the plates and the separators 16 I provide the container 11 with one or more rests 22, in this instance, bottom rests which may be in the form of spaced transverse ribs projecting above, and formed integrally with, the bottom wall 23 of the container. As shown in the drawing, these ribs may be tapered and may have rounded tops. The positive plates 15, to which the problem of growth compensation applies principally, may have depending lugs or feet 24 arranged in pairs and spaced apart so as to engage a pair of the rests 22, preferably with the lugs engaging the remote sides or edges of the rounded top portions of the rests at the contact points or areas 25 represented in the drawing.

To prevent the plate growth from pushing up the cover 12 and breaking the seal therearound, as explained above, I form the cooperating portions of the rests 22 and lugs 24 so that substantially all of the vertical component of the plate growth or expansion will take place downwardly, that is, away from the cover. To this end I employ a sloping or tapered sliding engagement between the plates and the rests and provide this engagement with a slope or angle such that, although the lower edges of the plates move downward, the plates will always remain in supporting engagement with the rests during their growth or expansion. In obtaining this desired result, I provide either the rests or the lugs, preferably the latter as shown in this instance, with the oppositely sloping or tapered faces 26. When these sloping faces or edges are formed on the lugs 24 of the plates, as shown in Fig. 1, they seat or bear against the outer or remote edges of the rounded tops of the rests 22 and thus support the plates thereon.

As growth of the plates takes place, the vertical dimension of the plates will increase but the lateral spacing of the lugs 24 will also increase, and this will permit the lower ends of the plates to move downwardly for the full extent of the increase in the vertical dimension. In other words, the sloping engagement between the plates and the rests causes the plate growth to act downwardly or away from the cover 12. This is further illustrated in Fig. 2 which shows the condition of the plates after growth has taken place. As will be seen from Fig. 2, the spacing of the lugs 24 has increased and the bottom portions of the positive plates 14 have moved downwardly closer to the bottom wall 23 and the contact areas 25 between the lugs and rests have traveled upwardly on the sloping faces or edges 26 of the lugs.

The sloping engagement provided between the plates and rests also serves to locate or center the plates with respect to the side walls of the container and prevents the plates from shifting out of this position. Even though growth takes place and brings the side edges of the plates closer to the side walls of the container and the edges of the separators 16, as shown in Fig. 2, the sloping engagement will still maintain the plates centered in the container and in this way the plates will be prevented from projecting unevenly beyond the separators and will also prevent engagement of the edges of the plates with the side walls of the container such as might result in bending or buckling of the plates.

Although I have shown and described my growth compensating means as applicable principally to the positive plates 14, it can be applied in a similar manner to the negative plates 15 but usually growth of the negative plates is so small that it causes no trouble and can be disregarded in which case the negative plates can be provided with ordinary feet or lugs 15a, as shown in the drawing, for supporting the same on the bottom rests 22.

The angle or slope to be employed in the sloping engagement between the plates and rests will depend upon certain factors, such as the dimensions or proportions of the particular plates under consideration and the spacing of the rests upon which the plates are supported. Since these factors may be different in different commercial embodiments of storage batteries, I have devised a formula by which the angle of this sloping engagement can be easily determined. This formula may be stated as $$\tan R = \frac{2X}{Z}$$

in which R is the angle of the sloping engagement between the plate foot or lug and the rest as measured with respect to the horizontal plane, X is the vertical dimension of the plate, and Z is the lateral spacing of the rests or the contact areas thereof.

To explain the derivation of this formula, I shall refer to the diagram of Fig. 4 which is a graphic illustration of the movement of the contact areas 25 between a plate and its rests as growth of the plate takes place. If it is assumed that $a$ is the total growth which takes place in the vertical dimension of the plate, then the downward movement of the contact areas 25 can be represented in the diagram of Fig. 4 by the vectors $a$. Likewise, if it is assumed that $b$ is the growth or total increase in the distance Z, that is, the spacing of the rests or contact areas, then the lateral movement of each contact area can be represented by the vectors designated $\frac{1}{2}b$ in the diagram of Fig. 4. Since K is the per cent of increase in any dimension of the plate as the result of the growth of the plate, as pointed out above, then it may be said that $a = KX$ and $b = KZ$.

In the diagram of Fig. 4 the angle R is the angle of the sloping engagement between the plate and the rests and it will be seen that $$\tan R = \frac{a}{\frac{1}{2}b} = \frac{2a}{b}$$

Substituting in this equation the value KX for $a$ and KZ for $b$, we have $$\tan R = \frac{2KX}{KZ}$$

or $$\tan R = \frac{2X}{Z}$$

To illustrate the use of this formula a concrete example may be taken in which the vertical dimension of the plates is 5⅝" or 5.625" and the spacing of the rests is 2¾" or 2.75". Using these dimensions for the values X and Z in the formula, we have the equation $$\tan R = \frac{2 \times 5.625}{2.75}$$

or $\tan R = 4.0909$ or angle $R = 76°$.

From the foregoing description and the accompanying drawing, it will now be readily seen that I have provided an improved storage battery having means for compensating for plate growth by controlling the direction or distribution of plate movement resulting from such growth. By this means the vertical component of the plate movement resulting from such growth can be made to act downwardly or away from the cover and thus loosening of the cover and breakage of the seal therearound will be avoided. Moreover, it will be seen that the cooperating portions of the plates and rests are so shaped that during the downward growth the plates remain continuously in supporting engagement with the rests and this engagement also serves to hold or center the plates between the side walls of the container and effectively prevents uneven shifting between the plates and separators. It will be seen furthermore that I have devised a formula whereby the sloping contact angle to be used in obtaining the benefits and advantages of my invention can readily be determined for different heights of battery plates and different spacings of the plate rests.

While I have illustrated and described my improved battery construction in a more or less detailed manner, it will be understood, of course, that I do not wish to be limited to the particular form of storage battery and details of construction herein disclosed, but regard my invention as including such changes and modifications as do not involve a departure from the spirit of the invention and the scope of the appended claims.

Having thus described my invention, I claim:

1. A storage battery comprising a container having a cover, a plate in the container having a pair of spaced contact portions, means in the container providing a pair of spaced contact portions adapted to be engaged on their remote sides by the contact portions of the plate for supporting the plate and holding the same against lateral shifting in the container, the contact portions of one of said pairs being tapered to cause the vertical movement of the plate resulting from plate growth to act in a direction away from the cover and the contact portions of the plate being slidable on the contact portions of the supporting means during such growth movement of the plate.

2. A storage battery comprising a container having a cover, a plate in the container having a pair of spaced contact portions, means in the container providing a pair of spaced contact portions adapted to be engaged on their remote sides by the contact portions of the plate for supporting the plate and holding the same against lateral shifting in the container, the contact portions of one of said pairs being oppositely tapered with the spacing and taper angle such as to cause the vertical movement of the plate resulting from plate growth to act in a direction away from the cover and the contact portions of the plate being slidable on the contact portions of the supporting means during such growth movement of the plate.

3. A storage battery comprising a container having a pair of laterally spaced plate rests adjacent the bottom thereof, and plates in the container having oppositely tapered feet spaced to engage said rests for supporting and locating the plates in the container, the bottom edges of the plates being spaced above the tops of said rests and said tapered feet being slidable on the outer sides of said rests during downward shifting of said bottom edges relative to the rests.

4. A storage battery comprising a container having a cover, a plate in the container having a pair of spaced contact portions, means in the container providing a pair of spaced contact portions adapted to be engaged on their remote sides by the contact portions of the plate for supporting and locating the plate in the container, the contact portions of one of said pairs being tapered to an angle determined by the formula $$\tan R = \frac{2X}{Z}$$

in which R is the taper angle from the horizontal, X is the height of the battery plate and Z is the spacing of the contact portions.

5. A storage battery comprising a container having spaced ribs with rounded tops projecting thereinto, and plates in the container extending crosswise of the ribs and having spaced depending portions provided with outwardly and downwardly sloping faces engaging the remote sides of said rounded tops for supporting and locating the plates in the container.

LELAND E. WELLS.